United States Patent [19]
Tomoda

[11] Patent Number: 5,706,511
[45] Date of Patent: Jan. 6, 1998

[54] DATA BASE SYSTEM AND LOAD DISTRIBUTION CONTROL METHOD

[75] Inventor: Masanori Tomoda, Tokyo, Japan

[73] Assignee: Kabushiki Kaisha Toshiba, Kawasaki, Japan

[21] Appl. No.: 404,770

[22] Filed: Mar. 15, 1995

[30] Foreign Application Priority Data

Mar. 16, 1994 [JP] Japan .................... 6-045888

[51] Int. Cl.$^6$ .................... G06F 11/06; G06F 13/00; G06F 7/00; G06F 9/46
[52] U.S. Cl. .................... 395/621; 395/601; 395/603; 395/604; 395/448; 395/460
[58] Field of Search .................... 395/600, 650, 395/448, 460, 601

[56] References Cited

U.S. PATENT DOCUMENTS

| | | | |
|---|---|---|---|
| 4,051,461 | 9/1977 | Hashimoto et al. | 364/900 |
| 5,283,897 | 2/1994 | Georgiadis et al. | 395/650 |
| 5,325,525 | 6/1994 | Shan et al. | 395/650 |
| 5,377,329 | 12/1994 | Seitz | 395/250 |
| 5,504,894 | 4/1996 | Ferguson et al. | 395/650 |
| 5,537,569 | 7/1996 | Masubuchi | 395/448 |
| 5,537,574 | 7/1996 | Elko et al. | 395/468 |
| 5,577,242 | 11/1996 | Yamaguchi et al. | 395/621 |
| 5,592,662 | 1/1997 | Sawada et al. | 395/601 |

OTHER PUBLICATIONS

Lu et al. "Dynamic and Load-balanced Task-Oriented Database Query Processing in Parallel Systems", pp. 356–373, Mar. 1992.

DeWitt et al. "Parallel database syste: The future of high performance database system", ACM,V35 n6, p. 85(14), Jun. 1992.

A. Dan, D. Dias and P. Yu; *Database Buffer Model for the Data Sharing Enviroment*; IEEE Sixth International Conference on Data Engineering on Data Engineering; Feb. 1990; pp. 538–544.

"Oracle In Parallel or Exclusive Mode", Oracle RDBMS Database Administrator's Guide—Addendum Version 6.2, sheet 1–6 (1991).

*Primary Examiner*—Thomas G. Black
*Assistant Examiner*—Jean M. Corrielus
*Attorney, Agent, or Firm*—Finnegan, Henderson, Farabow, Garrett & Dunner, L.L.P.

[57] ABSTRACT

A data base system according to the present invention has a data base including at least one table and executing predetermined data processing by accessing to the data base in accordance with transactions. The data base system comprises a plurality of management process for executing data processing in accordance with assigned transactions, a plurality of buffers respectively provided for the plurality of management process, for holding partial copies of the table as blocks, data management table for storing a number of blocks held by each of the plurality of buffers, and transaction control section for assigning the transaction to the management process corresponding to the buffer which holds the largest number of blocks on the basis of the number of blocks stored in the data management table.

4 Claims, 7 Drawing Sheets

| MANAGEMENT PROCESS ID | BLOCK NUMBER | STATUS | TABLE NAME |
|---|---|---|---|
| 1 | 5 | ro | table 1 |
| 1 | 12 | rw | table 2 |
| 2 | 7 | ro | table 4 |
| ⋮ | ⋮ | ⋮ | ⋮ |

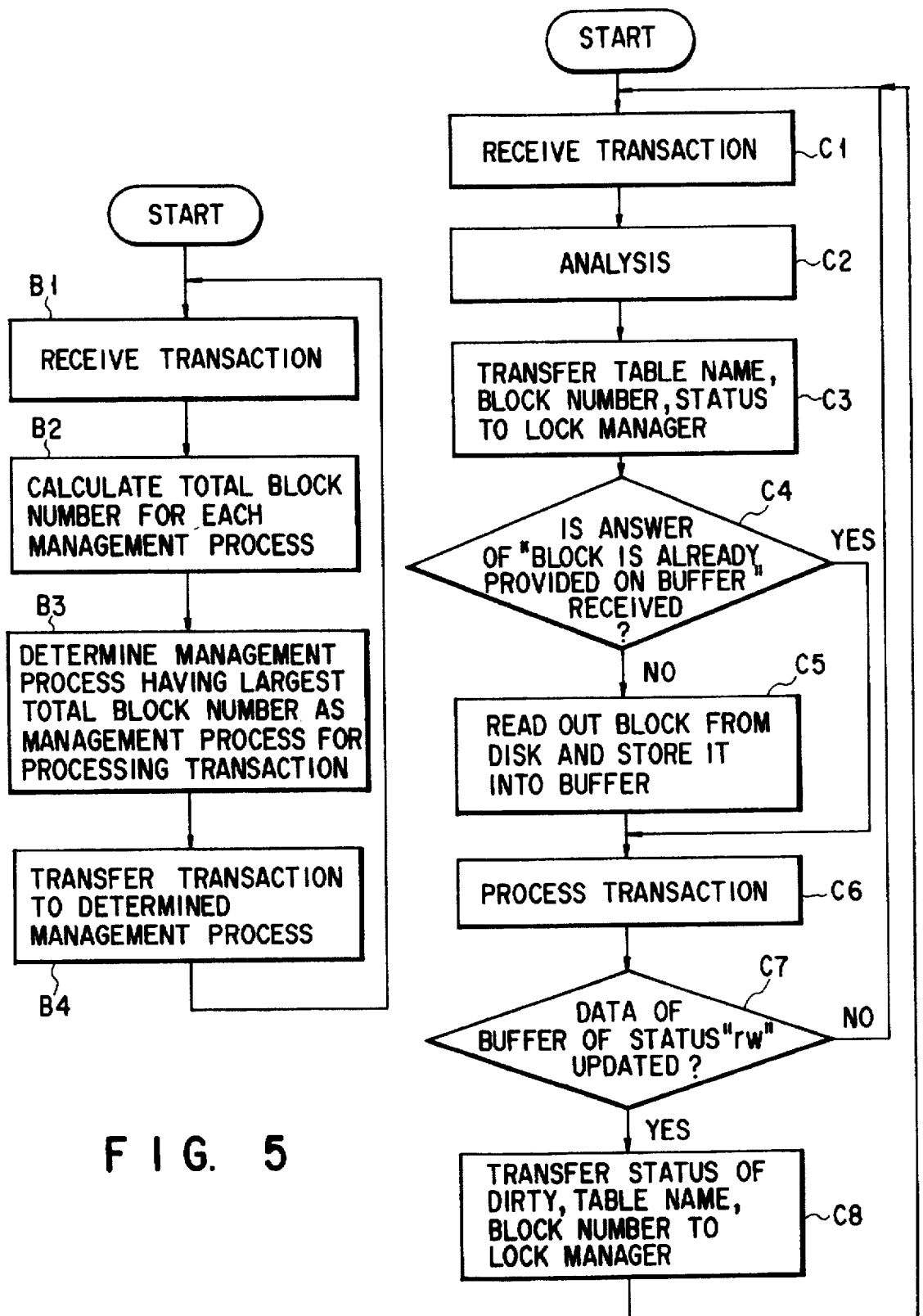
F I G. 5
F I G. 6

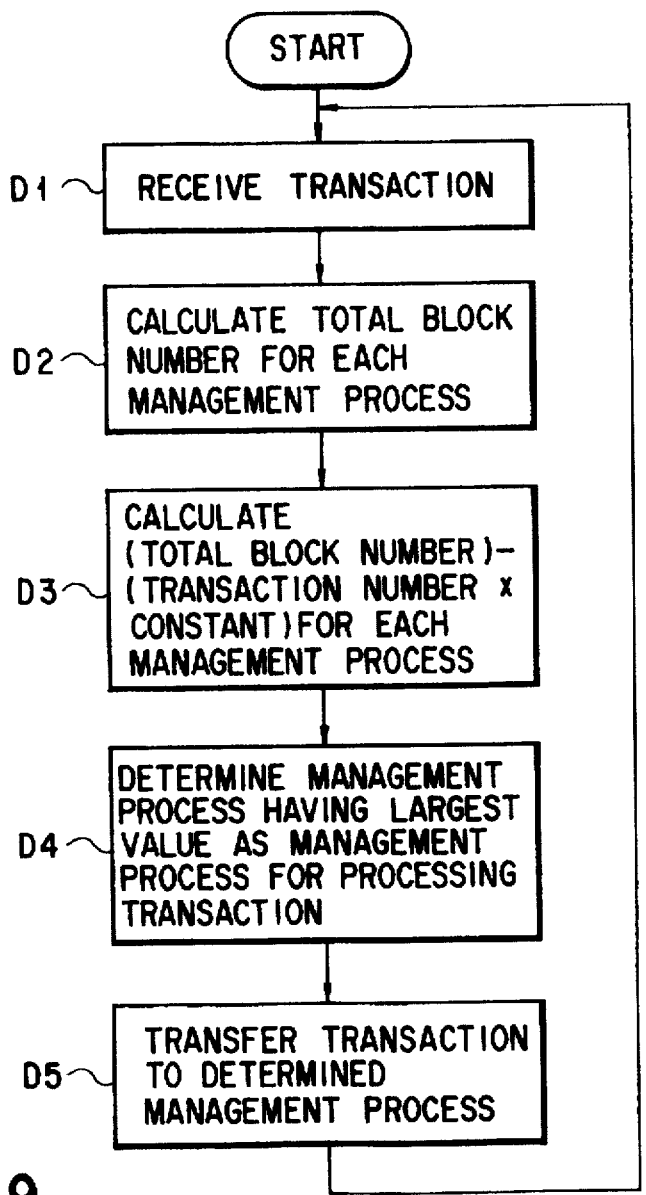

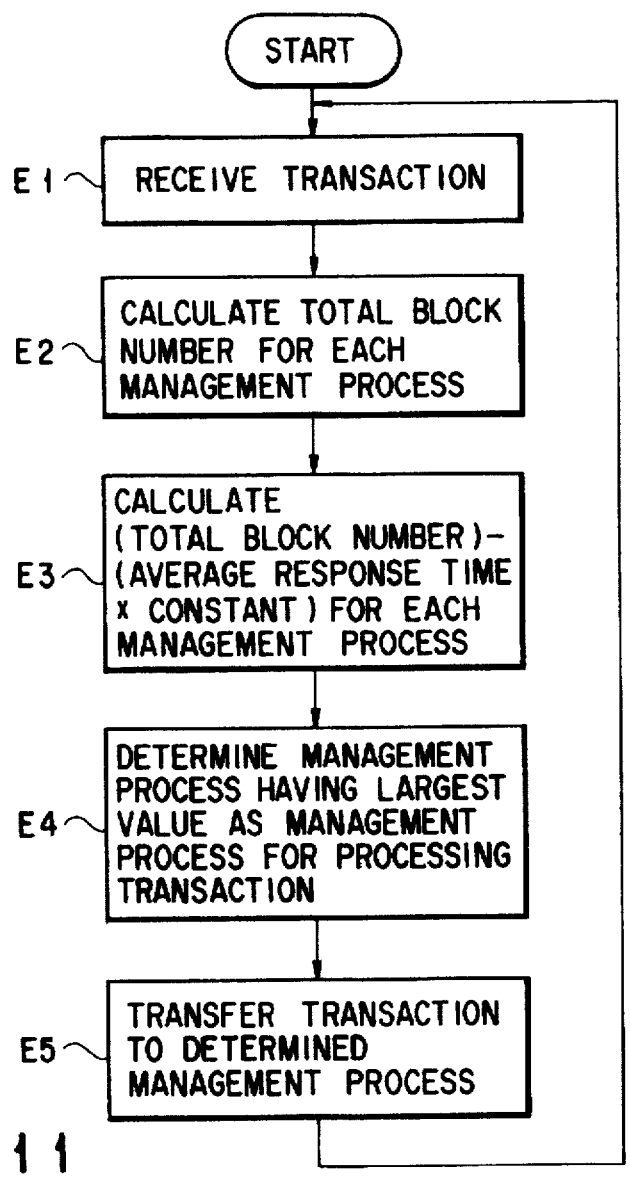
F I G. 11
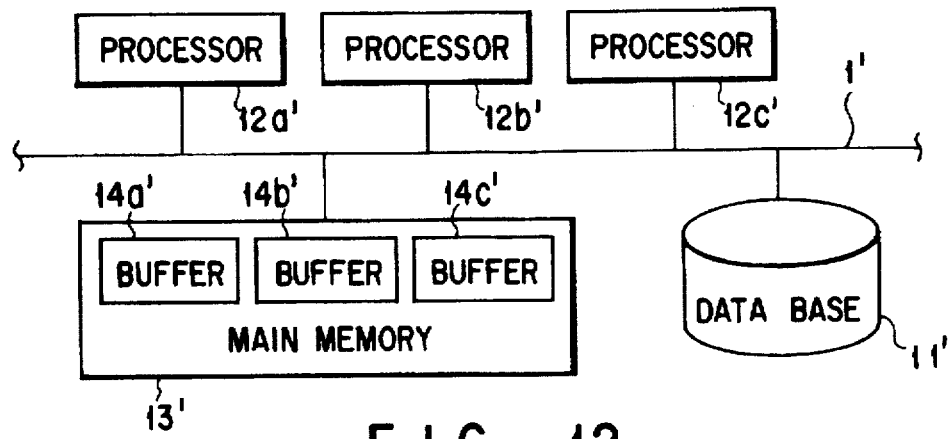
F I G. 12

DATA BASE SYSTEM AND LOAD DISTRIBUTION CONTROL METHOD

BACKGROUND OF THE INVENTION

1. Field of the Invention

This invention relates to a data base system by a multiprocessor system, and more particularly to a data base system in which a plurality of management processes retrieve and modify data in a data base according to transaction.

2. Description of the Related Art

Conventionally, a system for managing a data base by use of a plurality of data base management processes (which are hereinafter simply referred to as management processes) in a multiprocessor system having a plurality of processors is proposed. For example, it is disclosed in "ORCALE RDBMS Version 6.2 Database Administrator's Guide" Addendum.

The feature of this type of system is that a plurality of transactions can be efficiently processed in parallel. The respective management processes access the data base commonly used on the disk to update and delete data when the transaction is processed.

The management process has to-be-processed data (block) stored in a main memory (buffer), and since the operation is effected for the main memory without any I/O (Input/Output) operation when the same data is processed in the next cycle, the data processing can be executed at high speed. Further, if it is read-only data, the same data can be stored in the main memory of each management process and the data processing can be executed by a less number of I/O operations.

However, when one of data items on the main memory is updated, there occurs a possibility that the consistency thereof with respect to the same data (copy) on other main memories cannot be maintained. Therefore, a mechanism for maintaining the consistency of the data items on the main memories of the respective management processes, that is, lock control must be provided.

Further, when an management process accesses data which another management process stores in the main memory, lock control or data transfer between the main memories occurs and it takes a long time for the transaction processing. If the transaction is processed by an management process freely selected from a plurality of management processes, data movement as described before tends to occur, thereby lowering the throughput of the whole system.

When the transaction is processed, the disk operation is effected. Generally, the management process simultaneously processes a plurality of transactions in order to enhance the efficiency of use of the processor. In order to effect the above process, the management process creates an another process for each transaction. In order that the buffer can be commonly used by the processes, a shared memory is often used. In the conventional system, the processes sharing the buffer each have a function of "shared memory" which the operating system provides.

When the "shared memory" is used, it often takes an extremely long time to move data, causing the efficiency of work executed by each processor to be lowered. That is, when the shared memory is used and a large number of transactions are processed by an management process freely selected, time is exclusively used and each processor cannot efficiently work.

Thus, in the conventional system, when different management processes access the same data base, data frequently move between the buffers in some cases. In order to move data, extremely large overhead occurs. Therefore, there occur problems that the processor cannot be efficiently worked, it takes a long time for transaction processing, and the throughput of the whole system is lowered.

SUMMARY OF THE INVENTION

Accordingly, an object of this invention is to provide a data base system and a load distribution control method of executing the process of transactions at high speed by suppressing the data movement between buffers of the management processes.

According to a first aspect of this invention, there is provided a data base system having a data base including at least one table and executing predetermined data processing by accessing to the data base in accordance with transactions, the data base system comprising: a plurality of processing means for executing data processing in accordance with assigned transactions; a plurality of buffer means respectively provided for the plurality of processing means, for holding partial copies of the table as blocks; memory means for storing a number of blocks held by each of the plurality of buffer means; and control means for assigning the transaction to the processing means corresponding to the buffer means which holds the largest number of blocks, on the basis of the number of blocks stored in the memory means.

According to a second aspect of this invention, there is provided a data base system having a data base including at least one table and executing predetermined data processing by accessing to the data base in accordance with transactions, the data base system comprising: a plurality of processing means for executing data processing in accordance with assigned transactions; a plurality of buffer means respectively provided for the plurality of processing means, for holding partial copies of the table as blocks; first memory means for storing a number of blocks held by each of the plurality of buffer means; second memory means for storing the number of transactions being now processed by each of the plurality of processing means; and control means for assigning the transaction to one of the plurality of processing means, on the basis of the number of blocks stored in the first memory means and the number of transactions stored in the second memory means.

According to a third aspect of this invention, there is provided a data base system having a data base including at least one table and executing predetermined data processing by accessing to the data base in accordance with transactions, the data base system comprising: a plurality of processing means for executing data processing in accordance with assigned transactions; a plurality of buffer means respectively provided for the plurality of processing means, for holding partial copies of the table as blocks; first memory means for storing a number of blocks held by each of the plurality of buffer means; second memory means for storing average periods of time from start to finish in which each of the plurality of processing means executes data processing of the transactions; and control means for assigning the transaction to one of the plurality of processing means, on the basis of the number of blocks stored in the first memory means and the average period of time stored in the second memory means.

With the above construction, since data movement between the management processes can be suppressed and the process of each transaction can be efficiently effected, the throughput of the whole system can be enhanced.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a flowchart showing the operation procedure of a transaction control section shown in FIG. 2 used in the first embodiment;

FIG. 6 is a flowchart showing the operation procedure of each management process shown in FIG. 2 used in the first embodiment;

FIG. 8 is a diagram showing the content stored in an management process table shown in FIG. 7 used in the second embodiment;

FIG. 9 is a flowchart showing the operation procedure of a transaction control section shown in FIG. 7 used in the second embodiment;

FIG. 10 is a diagram showing the content stored in the management process table shown in FIG. 7 used in the third embodiment;

FIG. 11 is a flowchart showing the operation procedure of the transaction control section shown in FIG. 7 used in the third embodiment; and FIG. 12 is a block diagram showing the construction of a data base system constructing a shared memory type as a hardware configuration.

DETAILED DESCRIPTION OF THE PREFERRED EMBODIMENTS

There will now be described embodiments of this invention with reference to the accompanying drawings.

Figures 1, 3:
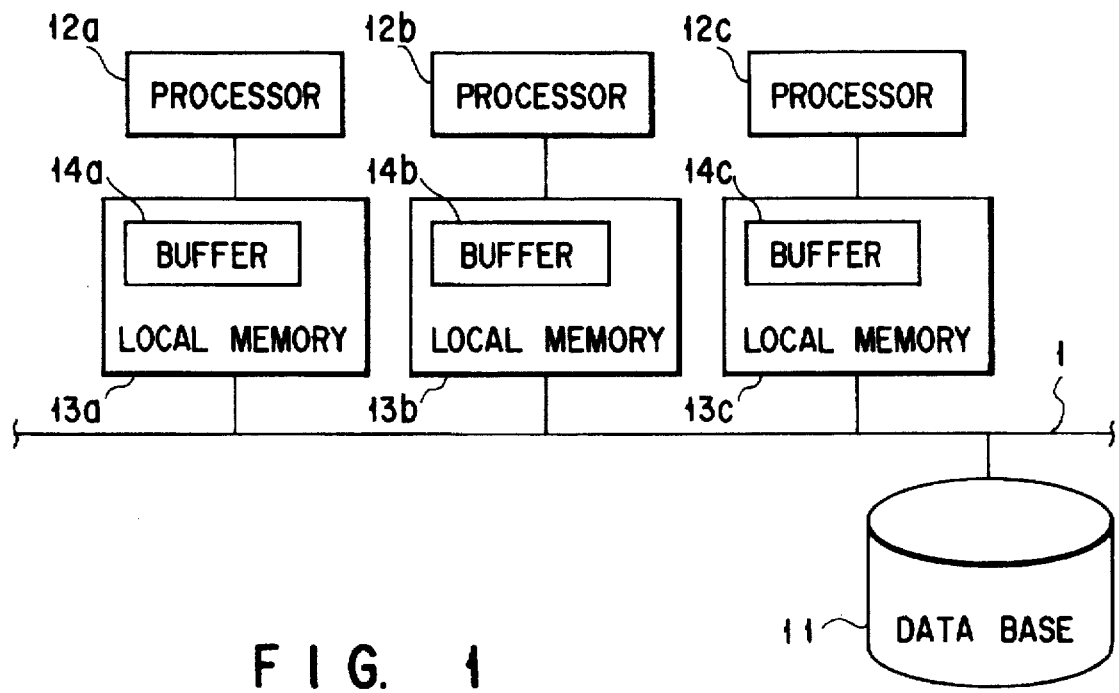
FIG. 1 is a block diagram showing the construction of a data base system constructing a distributed memory type as a hardware configuration in first to third embodiments of this invention.
FIG. 3 is a diagram showing the content stored in a data management table shown in FIG. 2 used in the first embodiment.

A data base system according to the first embodiment of this invention constructs a distributed memory type multiprocessor system shown in FIG. 1 as a hardware configuration, for example. That is, in a system in which a plurality of processors 12a, 12b, 12c are connected to a data base 11 via a bus 1, the processors respectively have local memories 13a, 13b, 13c. Buffers 14a, 14b, 14c (for temporarily storing data in the data base 11) are provided in parts of the respective local memories. Each processor reads out data from the data base 11 and writes it into the buffer of its own local memory or writes data stored in the buffer into the data base 11 as required.

In the above distributed memory type multiprocessor system having no shared memory, the processor 12a can access the local memory 13a (buffer 14a) at high speed, for example, but cannot access the local memory, for example, the local memory 13c (buffer 14c) which is different from its own local memory at high speed.

Figure 2:
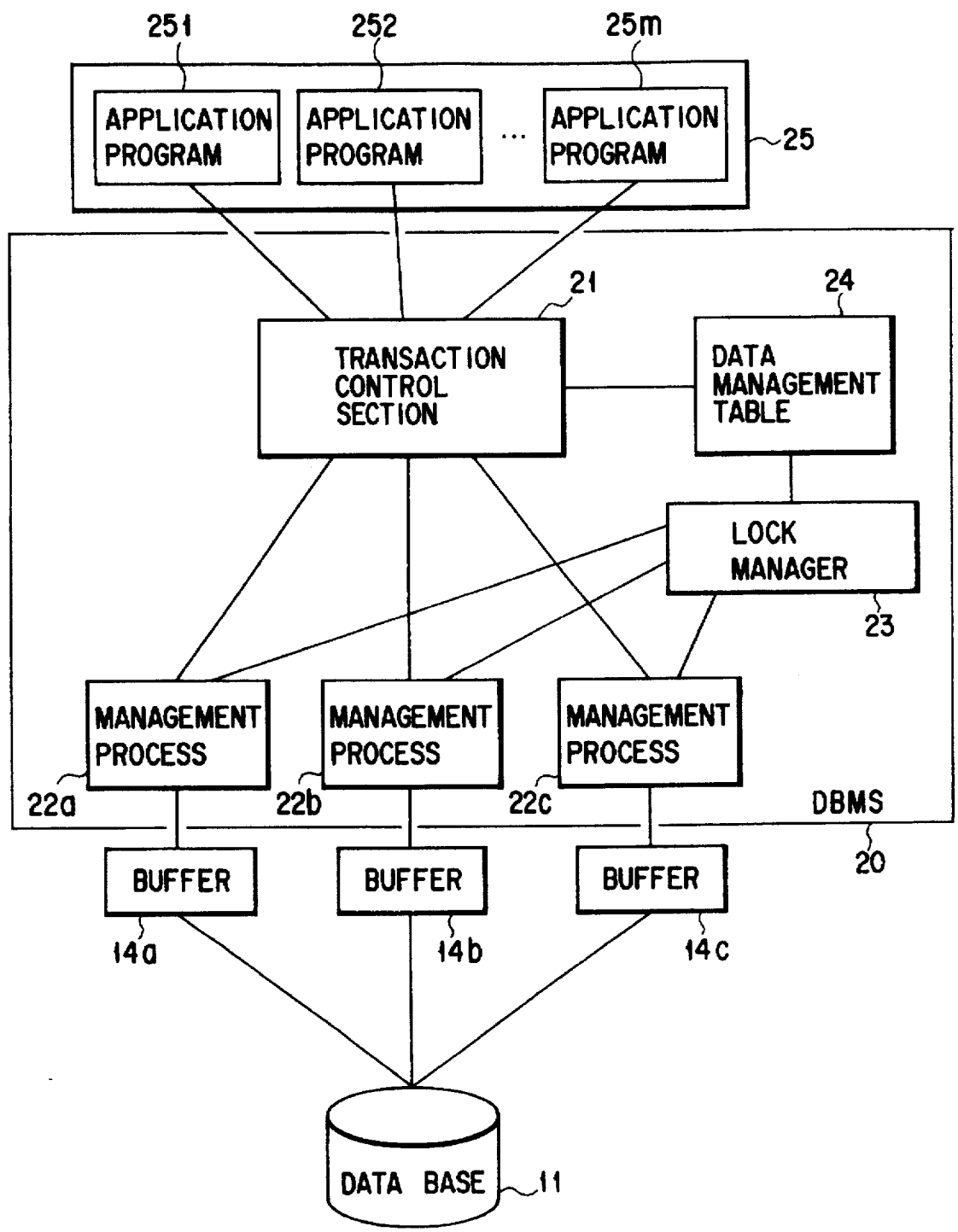
FIG. 2 is a block diagram showing the construction of a data base system represented with the software section set at the center.

FIG. 2 is a block diagram showing a data base system according to the first embodiment represented with the construction of the software section set at the center.

The data base 11 shown in FIG. 2 is a disk drive, for example, and stores a plurality of tables (not shown) according to the type of information. For example, a first table contains an address book of employees, a second table contains the result of sales for each department, a third table contains a list of customers, and thus each table includes different type of information. All or part of the information contained in each table can be read out or written by management processes 22a, 22b, 22c described later. The readout and write-in for the data base 11 are executed in a block unit. In this case, the "lock" means a group of information items treated at the time of transfer or the like.

To each of the above tables, a name (which is hereinafter referred to as "table name") for identifying the table is attached. Further, to each block in each of the tables, a number (which is hereinafter referred to as "lock number") for identifying the block is attached.

An application program storing section 25 stores a plurality of application programs 251, 252, - - - , 25m. Each of the application programs is constructed to issue preset transactions relating to the retrieval and updating of data in the data base 11 to a DBMS 20 which will be described later in response to an instruction by the operator.

The transaction consists the contents of the data base operations. Each of the contents of the data base operations are constructed by SQL. By analyzing the transaction, "the block to be processed", "the type of read-only/read-write" and the like can be obtained. The SQL indicates "Structured Query Language", which is specified as the data base language of International Standard. An instruction for changing the address of an employee in the preset table in the data base 11 is contained in the transaction, for example.

The database management system (DBMS) 20 is a software for receiving a transaction from each of the application programs 251, 252, - - - , 25m and collectively managing the retrieval and updating of data stored in the data base 11 so as to efficiently process the received transaction. The DBMS 20 is constructed by a transaction control section 21, management processes 22a, 22b, 22c, lock manager 23, and data management table 24.

When the transaction control section 21 receives a transaction from each of the application programs 251, 252, - - - , 25m, it determines a management process (which will be described later) suitable for processing the received transaction, and assigns the transaction to the management process. That is, the transaction control section 21 assigns the transaction to a management process on which the load of referring to data held by another management process is less frequently imposed when the transaction is processed. More specifically, the transaction control section 21 assigns the transaction so that the load on the management processes 22a, 22b, 22c will be distributed.

The transaction control section 21 determines the management process to which the transaction is to be assigned by referring to the data management table 24 as will be described later. More specifically, the transaction control section 21 calculates the "total block number" which is the total number of blocks held by the buffer of each of the management processes for each management process based on a list on the data management table 24. Then, the transaction control section 21 selects a management process having one of the buffers which holds the largest number of blocks.

The data management table 24 stores the statuses of the blocks held in each of the buffer for each block to ensure that the consistency control can be correctly effected by the lock manager 23 described later. More specifically, as shown in FIG. 3, the data management table 24 has a list indicating a set of "management process ID", "process number", "status" and "table name" for each block. Each set can be deleted by the lock manager 23. Further, the "status" in each set can be changed by the lock manager 23.

Further, the data management table 24 is used to determine a management process to which the transaction control section 21 should assign the transaction. That is, the data management table 24 is laid out so as to permit the transaction control section 21 to calculate the block number for each management process ID.

The management processes 22a, 22b, 22c are softwares respectively managed by the processors 12a, 12b, 12c, for example, and process transactions assigned by the transaction control section 21. That is, each management process retrieves or updates a to-be-processed block in the data base 11 on its own buffer (which will be described later) according to SQL contained in the assigned transaction.

The buffers 14a, 14b, 14c are respectively provided for the management processes 22a, 22b, 22c. Each buffer is used to temporarily store a to-be-processed block on the data base 11 so as to permit each of the management process to retrieve/update the block in a short period of time.

Each management process inquires of the lock manager 23 as to whether or not the to-be-processed block is held on its own buffer before processing the transaction. At the time of inquiry, each management process derives the "block number" of the to-be-processed block and the "table name" to which the block belongs in the data base 11 as well as the "status" by analyzing the contents of the data base operation contained in the transaction based on SQL.

In this case, the "status" indicates which of the statuses of "read only" and "read/write" should be held for the to-be-processed block and is represented by "status=ro" or "status=rw".

The "block number" and "table name" correspond to the "block to be processed" in the transaction and the "status" corresponds to "the type of read-only (ro)/read-write (rw)" in the transaction.

Further, each management process informs the lock manager 23 of the derived "table name", "block number", "status", and "management process ID" indicating its own identifying number. Each management process copies the to-be-processed block in the data base 11 onto its own buffer if the answer of the lock manager 23 made in response to the above inquiry is that "the to-be-processed block is not held on its own buffer".

In the transaction process, each management process executes the read-only process for a to-be-processed block on its own buffer if the transaction indicates "status=ro". Further, each management process executes the read-write process for a to-be-processed block on its own buffer if the transaction indicates "status=rw". That is, "status=ro" indicates the status in which the readout of a to-be-processed block can be effected (including the status in which the readout operation is now effected) and "status=rw" indicates the status in which the read/write of a to-be-processed block can be effected (including the status in which the read/write operation is now effected).

Further, each management process informs the lock manager 23 that the to-be-processed block becomes dirty when the read/write process is completed. In this case, the status in which the read/write process is completed and the block becomes dirty is indicated by "status=d".

Further, when the buffer of each management process holds a block having the latest content and if an instruction for writing the block on the data base 11 is issued from the lock manager 11, the management process follows the instruction. After the block is written into the data base 11, the "status" of the block is changed from "status=d" to "status=ro".

The lock manager 23 effects the consistency control for each block so as not to cause inconsistency in the contents of the block to occur between the buffers and between the data base 11 and each buffer.

For example, in a case where the buffer 14c holds a block having the latest content, a problem arises if the management process 22a is going to copy the same block lying on the data base 11 onto its own buffer 14a. This is because the content of the block on the data base 11 is already old. In this case, the lock manager 23 issues an instruction of writing the block on the buffer 14c into the data base 11 to the management process 22c.

Further, in a case where a block of "status=d" indicating the updated status is present on the buffer 14c, for example, a problem arises if the same block (copy) of "status=ro" is present on the other buffer 14a. This is because the content of the copy on the buffer 14a is already old. In this case, the lock manager 23 issues an instruction of discarding the copy of "status=ro" lying on the buffer 14a to the management process 22a.

In a case where a block of "status=ro" is present on a buffer, no problem occurs even if a copy of "status=ro" is present on another buffer since the content of the block is not updated. Further, in a case where a block of "status=rw" is present on a buffer, no problem occurs even if a copy of "status=ro" is present on another buffer since the content of the block is not yet determined even while it is being updated.

In order to effect the consistency control, the lock manager 23 uses the data management table 24. That is, the lock manager 23 refers to or changes (re-writes) the "status" of each block in the data management table 24 when required. Further, the lock manager 23 registers the content (one set of "management process ID", "block number", "status" and "table name") of a to-be-processed block and deletes the content of an old block.

For example, when the lock manager 23 receives information that "a block on the buffer of the process becomes dirty" from the management process, it changes the "status" of the block indicated on the data management table 24 from "status=rw" to "status=d". Further, when the lock manager 23 has written the block of "status=d" onto the data base 11, the block is not dirty and the "status" of the block indicated on the data management table 24 is changed from "status=d" to "status=ro".

The lock manager 23 responds to the inquiry (whether or not a to-be-processed block is held on the buffer of the management process) from each management process. More specifically, when the lock manager 23 receives one set of "management process ID", "table name", "block number" and "status" from each management process, it checks whether or not a to-be-processed block is present on the data management table 24 based on the "management process ID", "table name" and "block number" among the received set. Then, after the lock manager 23 executes a preset process for consistency control, it supplies the result of the above checking to the management process which has made the inquiry.

Next, the operation of the data base system according to the first embodiment is explained.

Figure 4:
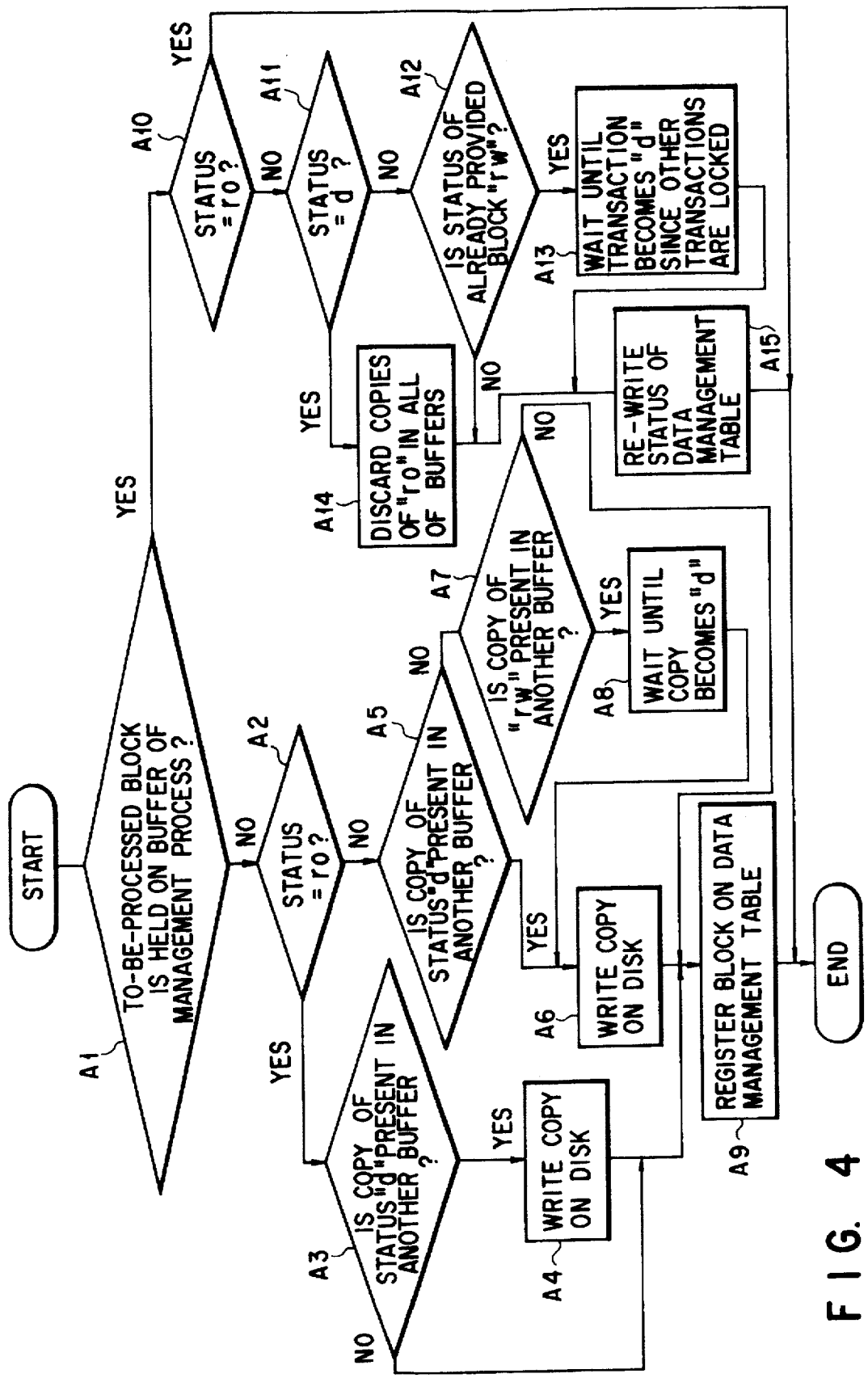
FIG. 4 is a flowchart showing the operation procedure of a lock manager shown in FIG. 2 used in the first embodiment.

First, the operation of the lock manager 23 is explained with reference to the flowchart of FIG. 4.

When the lock manager 23 receives an inquiry from the management process 22a, 22b or 22c, it checks whether or not a to-be-processed block is held on the buffer of the management process (step A1). That is, the lock manager 23 checks whether or not a set indicating a corresponding block is stored in the data management table 24 based on the "management process ID", "table name" and "block number" among the set of "management process ID", "table name", "block number" and "status" supplied by the management process.

If the to-be-processed block is not held on the buffer, whether or not the "status" supplied by the management process is "status=ro" is checked (step A2). That is, whether a corresponding transaction is to be processed for the read-only process or the read/write process is determined.

If the "status" is "status=ro", whether or not the same block (copy) of "status=d" is present on another buffer is determined by referring to the data management table 24 (step A3). If the copy is present, the copy must be reflected on the data base 11 (disk drive) since the copy has the latest content. In this case, the copy is written into the disk drive via a corresponding one of the management processes (step A4). At this time, the "status" of the copy on the data management table 24 is changed from "status=d" to "status=ro". On the other hand, if it is detected in the step A3 that there is no copy, the above copying operation is not necessary.

After this, one set of "management process ID", "table name", "block number" and "status (in this case, status=ro)" supplied by the management process is registered on the data management table 24 (step A9). After the registration, an answer that "the to-be-processed block is not held on the buffer of the management process" is supplied to the management process which has made the inquiry.

If it is detected in the step A2 that the "status" is not "status=ro" (that is, if it is "status=rw"), whether or not the same block (copy) of "status=d" is present on another buffer is determined (step A5). If the copy of "status=d" is present, the copy must be reflected on the disk drive since the copy has the latest content. In this case, the copy is written into the disk drive via a corresponding one of the management processes (step A6). At this time, the "status" of the copy on the data management table 24 is changed from "status=d" to "status=ro".

If it is detected in the step A5 that the copy of "status=d" is not present, whether or not the same block (copy) of "status=rw" is present on another buffer is determined (step A7). If the copy of "status =rw" is present, the process is set in the waiting state (step A8) until the "status" of the copy becomes "status=d" since the content of the copy is expected to be updated later. When the "status" of the copy becomes "status=d", the process proceeds to the step A6. If it is detected in the step A7 that the copy of "status=rw" is not present, then the process proceeds to the step A6, and one set of "management process ID", "table name", "block number" and "status (in this case, status=rw)" supplied by the management process is registered on the data management table 24 (step A9). After the registration, an answer that "the to-be-processed block is not held on the buffer of the management process" is supplied to the management process which has made the inquiry.

On the other hand, if it is detected in the step A1 that the to-be-processed block is held on the buffer, whether or not the "status" supplied by the management process is "status=ro" is determined (step A10).

If it is not "status=ro", whether or not the "status" of the to-be-processed block on the data management table 24 is "status=d" is determined (step A11). If the "status" is not "status=d" (that is, if it is "status=rw"), whether or not the "status" of a block which is already held on the buffer is "status=rw" is determined (step A12).

If the "status" is "status=rw", the process is set in the waiting state until the "status" of the block becomes "status=d" (step A13) since another (previous) transaction in the same management process is set in a locked state. After the "status" of the block becomes "status=d", the status in the data management table 24 is re-written (step A15). In this case, the "status" of a to-be-processed block in the data management table 24 is changed from "status=d" to "status=rw". After this, an answer that "the to-be-processed block is held on the buffer of the management process" is supplied to the management process which has made the inquiry and the process is ended.

If it is detected in the step A11 that the "status" of a to-be-processed block on the data management table 24 is "status=d", all of the same blocks (copies) of "status=ro" on the other buffers are discarded (step A14). After discarding the blocks, the content of the data management table 24 is changed (step A15). In this case, a set on the data management table 24 corresponding to the discarded copy is released. At the same time, the "status" of the to-be-processed block in the data management table 24 is changed from "status=d" to "status=rw". After this, an answer that "the to-be-processed block is held on the buffer of the management process" is supplied to the management process which has made the inquiry and the process is ended.

On the other hand, if it is detected in the step A12 that the "status" of the previously provided block is not "status=rw" (that is, it is "status=ro)", the status in the data management table 24 is rewritten (step A15). In this case, the "status" of the to-be-processed block in the data management table 24 is changed from "status=ro" to "status=rw". After this, an answer that "the to-be-processed block is held on the buffer of the management process" is supplied to the management process which has made the inquiry and the process is ended.

If it is detected in the step A10 that the "status" given by the management process is "status=ro", an answer that "the to-be-processed block is held on the buffer of the management process" is supplied to the management process which has made the inquiry and the process is ended.

Next, the operation of the transaction control section 21 is explained with reference to the flowchart of FIG. 5.

If a transaction is issued from one of the application programs 251, 252, - - - , 25m, the transaction control section 21 receives the transaction (step B1).

Further, the transaction control section 21 derives the "table name" to which a to-be-processed block belongs by analyzing the contents of the data base operation contained in the transaction based on SQL in the receiving operation of the step B1. A plurality of "table names" may be contained in one transaction in some cases for the operation effected for a plurality of tables.

The transaction control section 21 calculates the "total block number" for each management process by referring to the data management table 24 by use of the above derived "table name" (step B2). In this case, the "total block number" indicates the total number of blocks held on the buffer of each management process.

More specifically, the transaction control section 21 selects sets which contain the same "table name" as the above derived "table name" from a plurality of sets on the data management table 24 (each set includes "management process ID", "lock number", "status" and "table name"). Next, the transaction control section 21 divides the selected sets into groups each having the same "management process ID" for each "management process ID". As a result, the total block number for each "management process ID" can be derived.

Next, the transaction control section 21 selects one of the management processes which corresponds to the largest total block number among the total block numbers calculated in the step B2 and determines the selected management process as a management process for processing the transaction (step B3).

Since one of the management processes which corresponds to the largest total block number among the calculated total block numbers holds the largest number of blocks on its own buffer, it is expected that the block transfer between the buffers can be suppressed when a transaction to be assigned is processed.

Finally, the transaction control section 21 assigns the transaction to the management process which is determined to process the transaction (step B4).

Next, the operations of the management processes 22a, 22b, 22c are explained with reference to the flowchart of FIG. 6.

First, each management process receives a transaction from one of the applications 251, 252, - - - , 25m via the transaction control section 21 (step C1). Then, the management process having received the transaction analyzes the content of the data base operation contained in the transaction based on SQL (step C2).

From the above result of analysis, the management process can acquire the "table name", "lock number" and "status (status=ro or status=rw)" on the data base 11 of a to-be-processed block.

Next, the management process transfers the thus acquired "table name", "lock number" and "status" together with the "anagement process ID" which it holds to the lock manager 23 (step C3).

After this, the management process determines whether or not a to-be-processed block is already provided on its own buffer. That is, the management process determines whether or not an answer that "a to-be-processed block is already provided on the buffer" is received from the lock manager 23 (step C4). If the answer is not received, the management process stores (copies) the to-be-processed block on the data base 11 into its own buffer (step C5). On the other hand, if the answer is received, the copying operation is not necessary.

After the management process stores all of the blocks necessary for the process into its own buffer, it processes the transaction (step C6). That is, the management process accesses its own buffer based on the "table name", "block number" and "status" acquired by the above analysis.

Next, when the block of "status=rw" is updated (step C7), the management process transfers "status=d" indicating that the block is dirty together with the "table name", "lock number" and "management process ID" to the lock manager 23 (step C8), and the process is returned to the step C1. If it is detected in the step C7 that the block is not updated, the process is returned to the step C1 without executing any process.

As described above, according to the first embodiment, the transaction control section 21 assigns a transaction received from each of the application programs to the management process possessing a buffer which holds the largest number of blocks, by referring to the data management table 24. Since the possibility that the management process assigned with the transaction holds a to-be-processed block on its own buffer is high, the number of times of block transfer between the buffers can be reduced.

Next, a second embodiment is explained.

A data base system according to the second embodiment of this invention constructs a distributed memory type multiprocessor of FIG. 1 as the hardware structure as in the case explained in the first embodiment.

Figure 7:
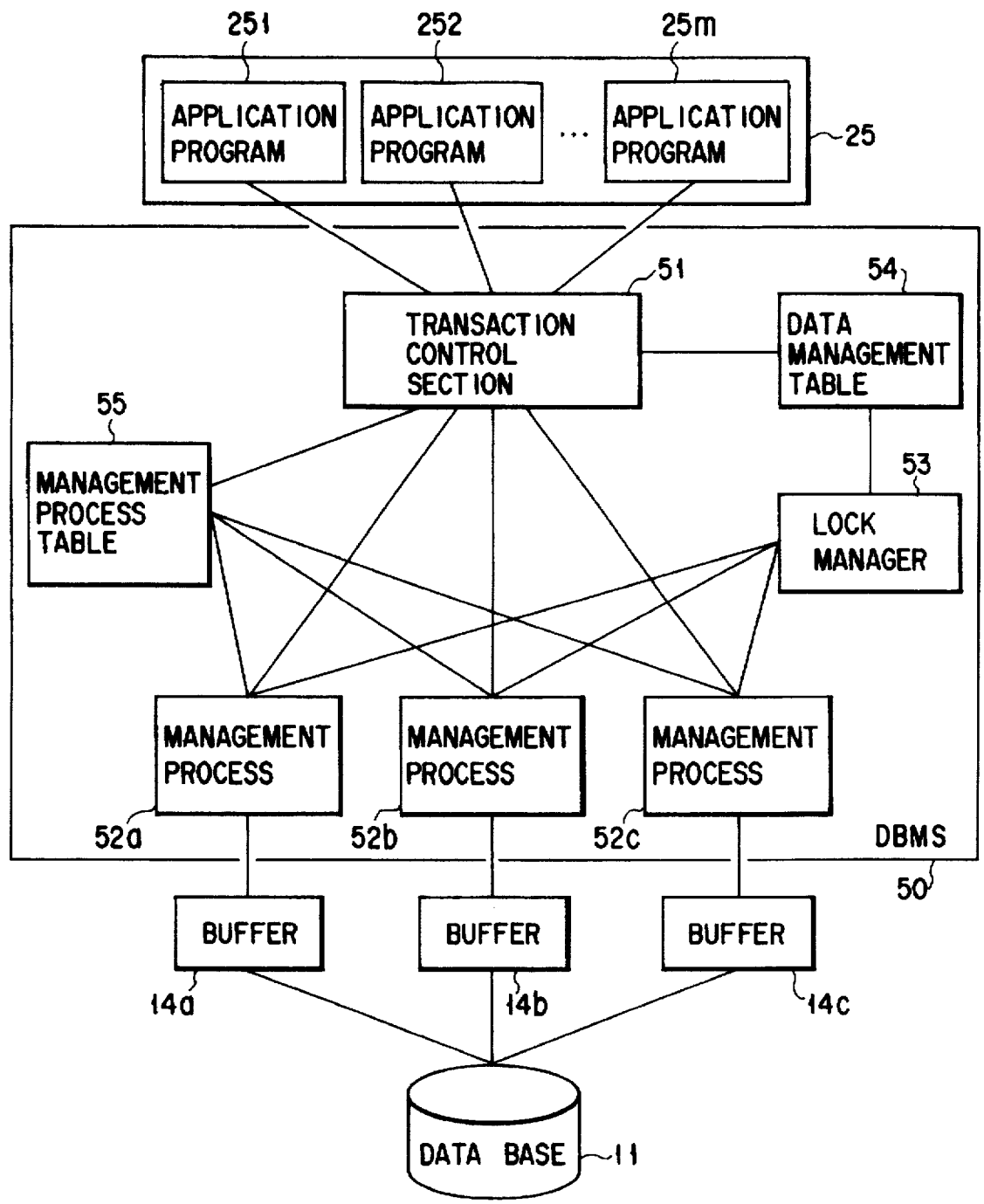
FIG. 7 is a block diagram showing the construction of a data base system represented with the software section set at the center.

FIG. 7 is a block diagram mainly showing the construction of the software section of the data base system according to the second embodiment.

A data base 11, buffers 14a, 14b, 14c, and application program storing section 25 (application programs 251, 252, - - - , 25m) shown in FIG. 7 are the same as corresponding portions of the first embodiment (FIG. 2). Therefore, the explanation therefor is omitted.

Like the DBMS 20 explained in the first embodiment (FIG. 2), a database management system (DBMS) 50 is a software for receiving a transaction from each of the application programs 251, 252, - - - , 25m and collectively managing the retrieval and updating of data stored in the data base 11 so as to efficiently process the received transaction. However, the DBMS 50 is different from the DBMS 20 in a method of assigning the transaction given from each of the application programs 251, 252, - - - , 25m.

The DBMS 50 is constructed by a transaction control section 51, management processes 52a, 52b, 52c, lock manager 53, data management table 54 and management process table 55. The lock manager 53 and the data management table 54 among the above constituents are the same as the lock manager 23 and the data management table 24 used in the first embodiment. Therefore, the explanation for the lock manager 53 and the data management table 54 is omitted.

When receiving a transaction from each of the application programs 251, 252, - - - , 25m, the transaction control section 51 determines a management process (which will be described later) suitable for processing the received transaction and assigns the transaction to the management process. That is, the transaction control section 51 assigns the transaction to a management process on which the load of referring to data held by another management process is less frequently imposed when the transaction is processed. More specifically, the transaction control section 51 assigns the transaction so that the load on the management processes 52a, 52b, 52c will be distributed.

The transaction control section 51 determines the management process to which the transaction is to be assigned by referring to the data management table 54 and the management process table 55. More specifically, the transaction control section 51 calculates the "total block number" which is the total number of blocks held by the buffer of each of the management processes for each management process based on a list on the data management table 54.

Further, the transaction control section 51 of the second embodiment derives the "transaction number" which is the number of transactions which are now processed by each of the management processes based on the list on the management process table 55. Then, the transaction control section 51 selects one of the management processes which holds a larger number of blocks and now processes a less number of transactions based on the "total block number" and the "transaction number".

Like the data management table 54, the management process table 55 is used to permit the transaction control section 51 to determine the management process to which the transaction is to be assigned. As shown in FIG. 8, the management process table 55 is constructed by sets of the "anagement process ID" which is the identification number of each management process and the "transaction number" indicating the number of transactions which the corresponding management process now processes. That is, the management process table 55 is laid out to permit the transaction control section 51 to derive "the number of transactions" which are now processed for each "management process ID".

The management processes 52a, 52b, 52c have the same functions as the management processes 22a, 22b, 22c of the first embodiment. However, the management processes 52a, 52b, 52c additionally have the following functions.

When a transaction is assigned from the transaction control section 51, each of the management processes increments the "transaction number" corresponding to its own "anagement process ID" by "1" in the management process table 55. This means that the number of transactions which are now processed is increased by "1". Further, when the process of the transaction is completed, each of the management processes reduces the "transaction number" corresponding to its own "anagement process ID" by "1" in the management process table 55. This means that the number of transactions which are now processed is reduced by "1".

Next, the operation of the data base system according to the second embodiment is explained.

The operation of the lock manager 53 is the same as the operation of the lock manager 23 of the first embodiment, and therefore, the operation thereof is omitted.

Next, the operation of the transaction control section 51 is explained with reference to the flowchart of FIG. 9.

If a transaction is issued from one of the application programs 251, 252, - - -, 25m, the transaction control section 51 receives the transaction (step D1).

Further, the transaction control section 51 derives the "table name" to which a to-be-processed block belongs by analyzing the contents of the data base operation contained in the transaction based on SQL in the receiving operation of the step D1. A plurality of "table names" may be contained in one transaction in some cases for operations for a plurality of tables.

The transaction control section 51 calculates the "total block number" for each management process by referring to the data management table 54 by use of the above derived "table name" (step D2). In this case, a concrete method of calculating the "total block number" is the same as that of the first embodiment (step B2 in FIG. 5).

At the same time, the transaction control section 51 calculates the "transaction number" for each management process (management process ID) by referring to the management process table 55.

Thus, the transaction control section 51 obtains the "total block number" and "transaction number" for each management process.

Next, the calculation expressed by the following expression is effected for each management process by use of the thus obtained "total block number" and "transaction number".

$$(\text{total block number}) - (\text{transaction number} \times \text{constant}) \quad (1)$$

where the constant is previously determined.

The transaction control section 51 determines one of the management processes which corresponds to the largest one of the values derived by the above expression (1) as a management process which is to process the above transaction (step D4).

Since one of the management processes which corresponds to the largest one of the values derived by the expression (1) holds the largest number of blocks on its own buffer, it is expected that the block transfer between the buffers can be suppressed when a transaction to be assigned is processed. Further, since the above management process is processing a less number of transactions, no severe load is imposed on the management process when the transaction is assigned, and therefore, the process can be completed in a short period of time.

Finally, the transaction control section 51 assigns the transaction to the management process which is determined to process the transaction (step D5).

Next, the operations of the management processes 52a, 52b, 52c are explained.

The operations of the management processes are obtained by adding the following processes to the operations of the respective management processes of the first embodiment (FIG. 6).

When assigned a transaction from the transaction control section 51 in the step C1 of FIG. 6, each management process increases the "transaction number" corresponding to its own "anagement process ID" by "1" in the management process table 55.

Further, when the process of the transaction in the step C6 of FIG. 6 is completed, each management process reduces the "transaction number" corresponding to its own "anagement process ID" by "1" in the management process table 55.

As described above, according to the second embodiment, the transaction control section 51 assigns a transaction received from the application program to one of the management processes which corresponds to the largest one of the values derived by the above expression (1) by referring to the data management table 54 and management process table 55. Since the possibility that the management process supplied with the transaction holds a to-be-processed block on its own buffer is high, the number of times of block transfer between the buffers can be reduced. Further, since the above management process is processing a less number of transactions, no severe load is imposed on the management process when the transaction is assigned, and therefore, the process can be completed in a short period of time.

Next, a data base system according to a third embodiment is explained.

The data base system according to the third embodiment of this invention constructs a distributed memory type multiprocessor system shown in FIG. 1 as a hardware configuration as in the case explained in the first embodiment.

Since the structure of the software section of the data base system is similar to that of the first embodiment (FIG. 7), it is explained with reference to FIG. 7.

A data base 11, buffers 14a, 14b, 14c, and application program storing section 25 (application programs 251, 252, - - - , 25m) are the same as corresponding portions of the second embodiment (FIG. 7). Therefore, the explanation therefor is omitted.

Like the DBMS explained in the second embodiment (FIG. 7), a database management system (DBMS) 50 is a software for receiving a transaction from each of the application programs 251, 252, - - - , 25m and collectively managing the retrieval and updating of data stored in the data base 11 so as to efficiently process the received transaction. However, the DBMS 50 is different from that of the second embodiment in a method of assigning the transaction given from each of the application programs 251, 252, - - - , 25m.

The DBMS 50 is constructed by a transaction control section 51, management processes 52a, 52b, 52c, lock manager 53, data management table 54 and management process table 55. The lock manager 53 and the data management table 54 among the above constituents are the same as those used in the second embodiment. Therefore, the explanation for the lock manager 53 and the data management table 54 is omitted.

Like the case of the second embodiment, the transaction control section 51 determines a management process to which the transaction is to be assigned by referring to the data management table 54 and management process table 55. More specifically, the transaction control section 51 calculates the "total block number" which is the total number of blocks held by the buffer of each of the management processes for each management process based on a list on the data management table 54.

The transaction control section 51 of the second embodiment derives the "transaction number" which is the number of transactions which are now processed by each of the management processes for each management process based on the list on the management process table 55. On the other hand, the transaction control section 51 of the third embodiment derives the "average response time" of each management process based on the list on the management process table 55. The "average response time" indicates an average period of time from the time when the management process starts processing the transaction to the time when the process of the transaction is completed. Then, the transaction control section 51 selects one of the management processes which holds a larger number of blocks and whose response time is shorter based on the "total block number" and the "average response time".

Like the data management table 54, the management process table 55 is used to permit the transaction control section 51 to determine one of the management processes to which the transaction is to be assigned. As shown in FIG. 10, the management process table 55 in the third embodiment is constructed by sets of the "management process ID" which is the identification number of each management process and the "average response time" which is the average response time of the corresponding management process. That is, the management process table 55 is laid out to permit the transaction control section 51 to derive the "average response time" for each "anagement process ID".

The management processes 52a, 52b, 52c have the same functions as the management processes 22a, 22b, 22c of the first embodiment. However, the management processes 52a, 52b, 52c additionally have the following functions.

Each of the management processes measures an execution period of time (response time) from the time when a transaction is supplied from the transaction control section 51 until the process of the transaction is completed. When the process of the transaction is completed, each management process calculates and updates the "average response time" by using the response time measured in the present cycle together with the "average response time" corresponding to its own "management process ID" in the management process table 55.

Next, the operation of the data base system according to the third embodiment is explained.

The operation of the lock manager 53 is the same as that of the second embodiment, and therefore, the operation thereof is omitted.

Next, the operation of the transaction control section 51 is explained with reference to the flowchart of FIG. 11.

If a transaction is issued from one of the application programs 251, 252, - - - , 25m, the transaction control section 51 receives the transaction (step E1).

Further, the transaction control section 51 derives the "table name" to which a to-be-processed block belongs by analyzing the contents of the data base operation contained in the transaction based on SQL in the receiving operation of the step E1. A plurality of "table names" may be contained in one transaction in some cases for the operation effected for a plurality of tables.

The transaction control section 51 calculates the "total block number" for each management process by referring to the data management table 54 by use of the above derived "table name" (step E2). In this case, a concrete method of calculating the "total block number" is the same as that of the first embodiment (step B2 in FIG. 5).

At the same time, the transaction control section 51 calculates the "average response time" for each management process (management process ID) by referring to the management process table 55.

Thus, the transaction control section 51 obtains the "total block number" and "average response time" for each management process.

Next, the calculation expressed by the following expression is effected for each management process by use of the thus obtained "total block number" and "average response time".

$$\text{(total block number)} - \text{(average response time} \times \text{constant)} \qquad (2)$$

where the constant is previously determined.

The transaction control section 51 determines one of the management processes which corresponds to the largest one of the values derived by the above expression (2) as a management process which is to process the above transaction (step E4).

Since one of the management processes which corresponds to the largest one of the values derived by the expression (2) holds a large number of blocks on its own buffer, it is expected that the block transfer between the buffers can be suppressed when a transaction to be assigned is processed. Further, since the response time of the management process is short, no severe load is imposed on the management process when the transaction is assigned, and therefore, the process can be completed in a short period of time.

Finally, the transaction control section 51 assigns the transaction to the management process which is determined to process the transaction (step E5).

Next, the operations of the management processes 52a, 52b, 52c are explained.

The operations of the management processes are obtained by adding the following processes to the operations of the respective management processes of the first embodiment (FIG. 6).

When receiving a transaction from the transaction control section 51 in the step C1 of FIG. 6, each management process starts the measurement for measuring the execution time of the transaction.

Further, when the process of the transaction in the step C6 of FIG. 6 is completed, each management process terminates the measurement and calculates the response time. Then, the management process calculates and updates the "average response time" by using the response time measured in the present cycle together with the "average response time" corresponding to its own "management process ID" in the management process table 55.

As described above, according to the third embodiment, the transaction control section 51 assigns a transaction received from the application program to one of the management processes which corresponds to the largest one of the values derived by the above expression (2) by referring to the data management table 54 and management process table 55. Since the possibility that the management process supplied with the transaction holds a to-be-processed block on its own buffer is high, the number of times of block transfer between the buffers can be reduced. Further, since the response time of the management process is short, no severe load is imposed on the management process when the transaction is assigned, and therefore, time required for processing the transaction can be shortened.

As described above, according to this invention, since the movement of data between the management processes can be suppressed and the process of each transaction can be efficiently executed, the throughput of the whole system can be enhanced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, in the first to third embodiments, a case wherein the distributed memory type multiprocessor system (FIG. 1) is constructed as an example of the hardware structure of the data base system is explained, but instead of this, it is possible to construct a shared memory type multiprocessor system shown in FIG. 12. In this case, a plurality of processors 12a', 12b', 12c' share one main memory 13'. Buffers 14a', 14b', 14c' for the processors 12a', 12b', 12c' are provided in the main memory 13'.

What is claimed is:

1. A data base system having a data base storing a plurality of tables each having data blocks and executing predetermined data processing by accessing to the data base in accordance with transactions having information indicating a target table name, the data base system comprising:

a plurality of processing means for executing data processing in accordance with assigned transactions;

a plurality of buffer means, respectively provided for said plurality of processing means, for holding partial copies of blocks in the tables stored in said data base;

memory means for storing a set of a block number, a corresponding table name, and a corresponding buffer means identifier for each of the blocks currently held in said plurality of buffer means; and control means for deriving the target table name from the transaction, calculating a number of blocks corresponding to the derived target table name for each of said plurality buffer means by referring to the stored sets, and assigning the transaction to the processing means corresponding to the buffer means which holds the largest number of blocks.

2. A data base system having a data base storing a plurality of tables each having data blocks and executing predetermined data processing by accessing to the data base in accordance with transactions having information indicating a target table name, the data base system comprising:

a plurality of processing means for executing data processing in accordance with assigned transactions;

a plurality of buffer means, respectively provided for said plurality of processing means, for holding partial copies of blocks in the tables stored in said data base;

first memory means for storing a set of a block number, a corresponding table name, and a corresponding buffer means identifier, for each of the blocks currently held in said plurality of buffer means;

second memory means for storing the number of transactions being now processed by each of said plurality of processing means; and control means for deriving the target table name from the transaction, calculating a number of blocks corresponding to the derived target table name for each of said plurality of buffer means by referring to the stored sets, and assigning the transaction to the processing means corresponding to the buffer means which holds the larger number of blocks and is processing a small number of transactions.

3. In a data base system having a data base storing a plurality of tables each having data blocks, a plurality of management processes executing predetermined data processing by accessing to the data base in accordance with transactions having information indicating a target table name, and a plurality of buffers respectively provided for said plurality of management processes and holding partial copies of blocks in the tables stored in said data base, a load distribution control method of assigning transactions to said plurality of data management processes comprising the steps of:

storing a set of a block number, a corresponding table name, and a corresponding buffer identifier for each of the blocks currently held in said plurality of buffers;

deriving the target table name from the transaction;

calculating a number of blocks corresponding to the derived target table name for each of said plurality of buffers by referring to the stored sets: and assigning the transaction to the management process corresponding to the buffer which holds the largest number of blocks.

4. In a data base system having a data base storing a plurality of tables each having data blocks, a plurality of management processes executing predetermined data processing by accessing to the data base in accordance with transactions having information indicating a target table name, and a plurality of buffers respectively provided for said plurality of management processes and holding partial copies of blocks in the tables stored in said data base, a load distribution control method of assigning transactions to said plurality of data management processes comprising the steps of:

storing a set of a block number, a corresponding table name, and a corresponding buffer identifier for each of the blocks currently held in said plurality of buffers;

storing a number of transactions being now processed by each of said plurality of management processes;

deriving the target table name from the transaction;

calculating a number of blocks corresponding to the derived target table name for each of said plurality of buffers by referring to the stored sets; and assigning the transaction to the management process corresponding to the buffer which holds the larger number of blocks and is processing a small number of transactions.

* * * * *